Jan. 20, 1953  C. E. WALLACE  2,626,171
GATE LATCH
Filed June 10, 1949
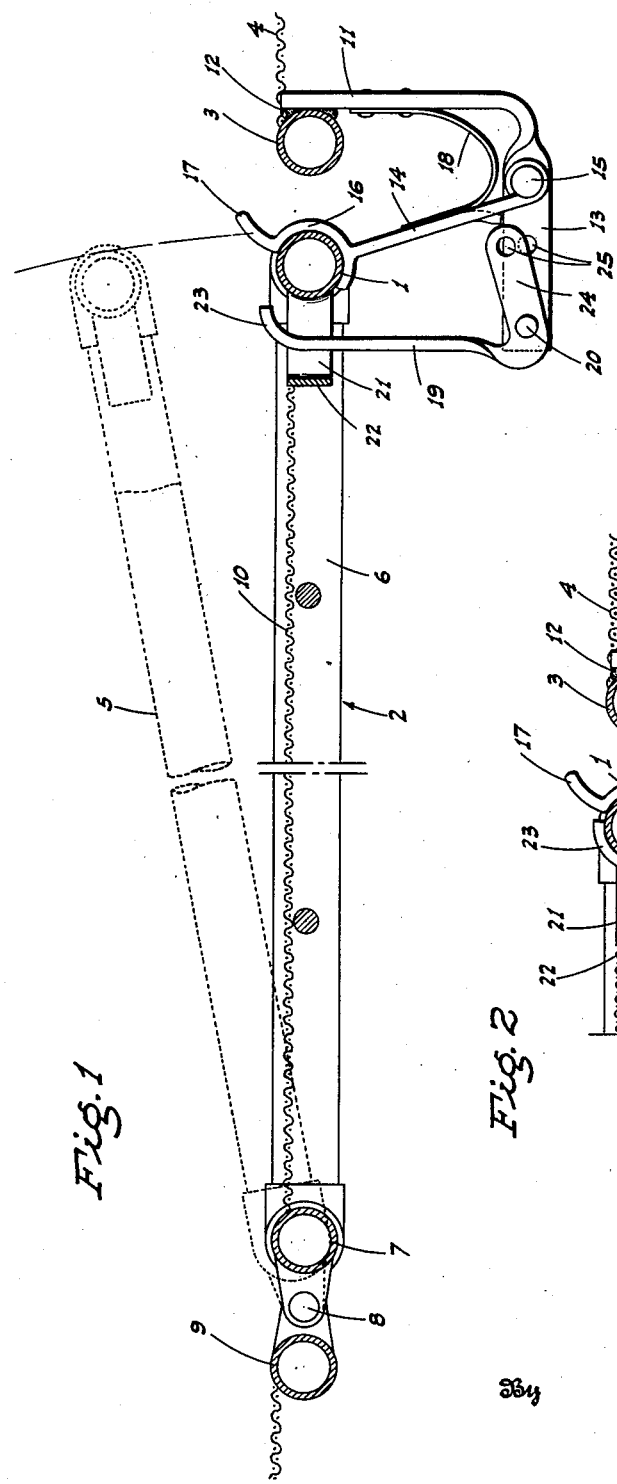
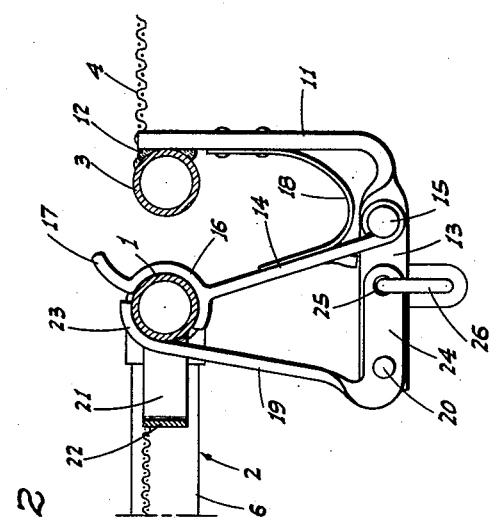
Inventor
Clarence E. Wallace
By
ATTORNEYS Patented Jan. 20, 1953

2,626,171

UNITED STATES PATENT OFFICE 2,626,171

GATE LATCH

Clarence E. Wallace, Yuba City, Calif., assignor of one-half to Ester L. Hiatt, San Mateo, Calif.

Application June 10, 1949, Serial No. 98,257

4 Claims. (Cl. 292—128)

This invention is directed to, and it is an object to provide, a novel latch for gates, especially those of metal which include a metallic post at the free end.

Another object of the invention is to provide a device, as above, embodying a novel locking arrangement for securing the gate against unauthorized opening.

A further object of the invention is to provide a gate latch wherein the latching means is comprised of a spring pressed, snap-action latch arm which functions automatically and effectively to receive and releasably secure the adjacent post of the gate upon closing of the latter.

An additional object of the invention is to provide a gate latch designed for ease and economy of manufacture; such unit being simple but sturdy in structure.

A further object of the invention is to provide a practical and reliable gate latch, and one which will be exceedingly effective for the purpose for which it is designed.

These objects are accomplished by means of such structure and relative arrangement of parts as will fully appear by a perusal of the following specification and claims.

In the drawings:

Fig. 1 is a plan view of the device as mounted to work with a gate; the latter being in section and latched, and the locking arm being shown in open position.

Fig. 2 is a plan view of the device with the gate latched, and the locking arm in closed or holding position.

Referring now more particularly to the characters of reference on the drawings, the novel gate latch is adapted for use between the free end post 1 of a gate 2, and the normally adjacent post 3 of a fence 4. The gate 2, with which the latch is adapted to be used, is preferably of the tubular metal type, including—in addition to the free end post 1—a top bar 5, a bottom bar 6, and an inner end post 7 hinged, as at 8, to a fence post 9. The wire mesh of the gate is indicated at 10.

The gate latch comprises a rigid bracket 11 fixed, as by welding or the like as at 12, to the post 3 and thence extends horizontally therefrom opposite the direction of opening movement of the gate 2; the direction of opening of such gate being indicated by its dotted line position in Fig. 1.

At its outer end the rigid bracket 11 is formed with an inturned, lateral mounting bar 13 which is disposed clear of the free end post 1 of the gate when the latter is closed.

A latch arm 14 is vertically pivoted, as at 15, to the mounting bar 13, and thence extends toward the gate. At its free end the latch arm 14 is formed with a substantially semi-circular cradle 16 which opens generally laterally in a direction away from the post 3.

At its outermost end the cradle 16 is formed with an arcuate, cam-like strike finger 17 which lies in the path of the free end post 1 when the gate 2 is closing; this for the purpose of deflecting the latch arm sufficiently to permit said free end post 1 to engage in a cradle 16 in snap-in relation when said gate closes.

Such snap action results by reason of the employment of a leaf spring 18 connected between the bracket 11 and the latch arm 14, in the manner shown.

With the above snap-action latch arm 14, the gate 2 is normally but releasably maintained in its closed position, and whenever said gate is swung to such position, engagement of the free end post 1 in the cradle 16 automatically results.

When it is desired to lock the gate, i. e. to lock the free end post 1 against escape from the cradle 16, the following mechanism is brought into play:

A lock arm 19 is vertically pivoted, as at 20, to the mounting bar 13 in spaced relation from the latch arm 14, and projects toward the gate on the opposite side of the free end post 1. The gate includes an opening 21 therein adjacent the post 1 for the projection through the gate of the lock arm 19; such opening 21 being bordered by a rigid frame 22.

At its free end the lock arm 19 includes an arcuate or inturned tip 23 adapted to engage the free end post 1 in a manner to prevent said post from moving in a gate opening direction when said lock arm 19 is in a locked position, as in Fig. 2.

The lock arm 19 may be maintained in such locked position as follows:

At its inner end said lock arm 19 is formed with a lateral, locking tongue 24 which overhangs the mounting bar 13 when arm 19 is in said locking position; there being a pair of holes 25 in said tongue 24 and bar 13 then matching. A padlock 26 is engaged through said matching holes whereby to prevent movement of the tongue 24 or arm 19, with the result that the free end post 1 cannot swing by the inturned tip 23 in a gate opening direction.

The above described gate latch functions effectively to maintain the gate in yieldably latched closed position.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A latch for a hinged gate having a free end post disposed, when the gate is closed, adjacent but spaced from a fixed post; said latch comprising a rigid bar disposed behind the gate post relative to the predetermined direction of opening movement of the gate, a bracket securing the bar to the fixed post, a horizontal spring-urged latch arm pivoted on the bar and projecting toward the gate post, and a post-receiving cradle on the arm projecting between the posts and facing in the direction of the hinged edge of the gate to rest about the gate post on the side thereof nearest the fixed post when the gate is moved to a closed position; the posts being spaced apart sufficient to allow of swinging movement of the latch arm to a gate-post clearing position.

2. A latch as in claim 1, in which the bar projects across the path of movement of the gate post in a direction to prevent opening movement of the gate in other than said predetermined direction.

3. A latch as in claim 1, with means to limit movement of the latch arm away from the fixed post, and a strike finger projecting from the edge of the cradle furthest from the arm and projecting into the path of the gate post as the gate approaches a closed position, the finger also serving as a manually engageable element for releasing the latch from the gate.

4. A structure as in claim 1, with a manually operable latch element mounted on the bar to engage the gate post opposite the cradle.

CLARENCE E. WALLACE.

REFERENCES CITED

The following references are of record in the file of this patent:

UNITED STATES PATENTS

| Number | Name | Date |
|--------|------|------|
| 636,365 | Stelzenmuller | Nov. 7, 1899 |
| 1,847,564 | Hood | Mar. 1, 1932 |
| 1,910,029 | Millar et al. | May 23, 1933 |